United States Patent
Nakayama

(10) Patent No.: US 9,789,397 B2
(45) Date of Patent: Oct. 17, 2017

(54) GAME SYSTEM, INFORMATION PROCESSING APPARATUS, CONTROL METHOD, AND RECORDING MEDIUM

(71) Applicant: SQUARE ENIX CO., LTD., Tokyo (JP)

(72) Inventor: Takanori Nakayama, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 317 days.

(21) Appl. No.: 14/620,574

(22) Filed: Feb. 12, 2015

(65) Prior Publication Data

US 2015/0251090 A1    Sep. 10, 2015

(30) Foreign Application Priority Data

Mar. 7, 2014 (JP) .................. 2014-045522

(51) Int. Cl.
*A63F 13/30* (2014.01)
*A63F 13/31* (2014.01)

(52) U.S. Cl.
CPC .............. *A63F 13/31* (2014.09); *A63F 13/30* (2014.09); *A63F 2300/534* (2013.01)

(58) Field of Classification Search
CPC .................. A63F 13/30; A63F 13/31
See application file for complete search history.

(56) References Cited

U.S. PATENT DOCUMENTS

| | | | | |
|---|---|---|---|---|
| 6,005,180 A | * | 12/1999 | Masuda | G10H 1/0016 84/622 |
| 2010/0325255 A1 | | 12/2010 | Cheung et al. | |
| 2013/0339421 A1 | * | 12/2013 | Dawson | A63F 13/60 709/203 |
| 2015/0067016 A1 | * | 3/2015 | Park | H04W 4/08 709/201 |
| 2015/0190717 A1 | * | 7/2015 | Li | A63F 13/40 463/43 |
| 2015/0373198 A1 | * | 12/2015 | Ruetschi | H04M 3/54 379/211.01 |

FOREIGN PATENT DOCUMENTS

JP        5357752        9/2013

* cited by examiner

*Primary Examiner* — Corbett B Coburn
(74) *Attorney, Agent, or Firm* — Greenblum & Bernstein, P.L.C.

(57) ABSTRACT

A game system executes a game that progresses in response to action commands issued on a plurality of electronic devices. When a first action command has been issued on a first electronic device, the system notifies a second electronic device, which is different from the first electronic device, of the issuance of the action command on the first electronic device. The system also sets a first time period until an action triggered by the first action command is reflected in the game, and after the elapse of the first time period from the time based on the first action command, reflects the action triggered by the first action command in the game executed by the second electronic device.

10 Claims, 12 Drawing Sheets

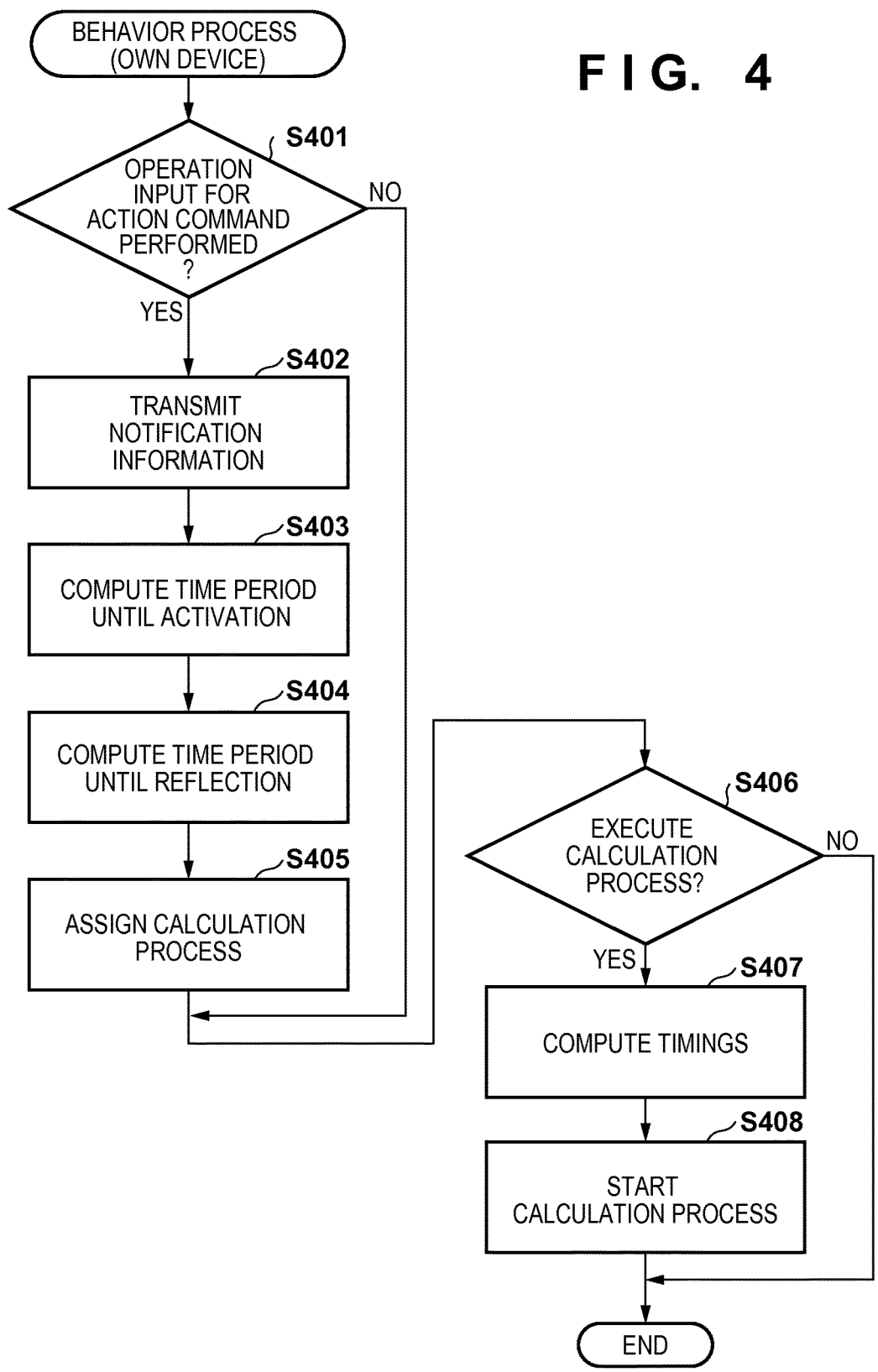
F I G. 4

FIG. 6A

| UNIT ID | BASIC PARAMETER | MOVING VELOCITY | COMMANDABLE ACTION ID | ACCOMPLISHMENT ABILITY |
|---------|-----------------|-----------------|------------------------|------------------------|
| UNIT A  | PARAMETER A     | VELOCITY A      | ACTION 1               | ABILITY 1A             |
|         |                 |                 | ACTION 2               | ABILITY 2A             |
|         |                 |                 | ACTION 5               | ABILITY 5A             |
| UNIT B  | PARAMETER B     | VELOCITY B      | ACTION 2               | ABILITY 2B             |
|         |                 |                 | ACTION 3               | ABILITY 3B             |
|         |                 |                 | ACTION 4               | ABILITY 4B             |

FIG. 6B

| ACTION ID | INFLUENCE PARAMETER | TIME PERIOD REQUIRED FOR ACTIVATION |
|-----------|---------------------|-------------------------------------|
| ACTION 1  | PARAMETER 1         | TIME PERIOD 1                       |
| ACTION 2  | PARAMETER 2         | TIME PERIOD 2                       |
| ACTION 3  | PARAMETER 3         | TIME PERIOD 3                       |
| ACTION 4  | PARAMETER 4         | TIME PERIOD 4                       |
| ACTION 5  | PARAMETER 5         | TIME PERIOD 5                       |

F I G. 7
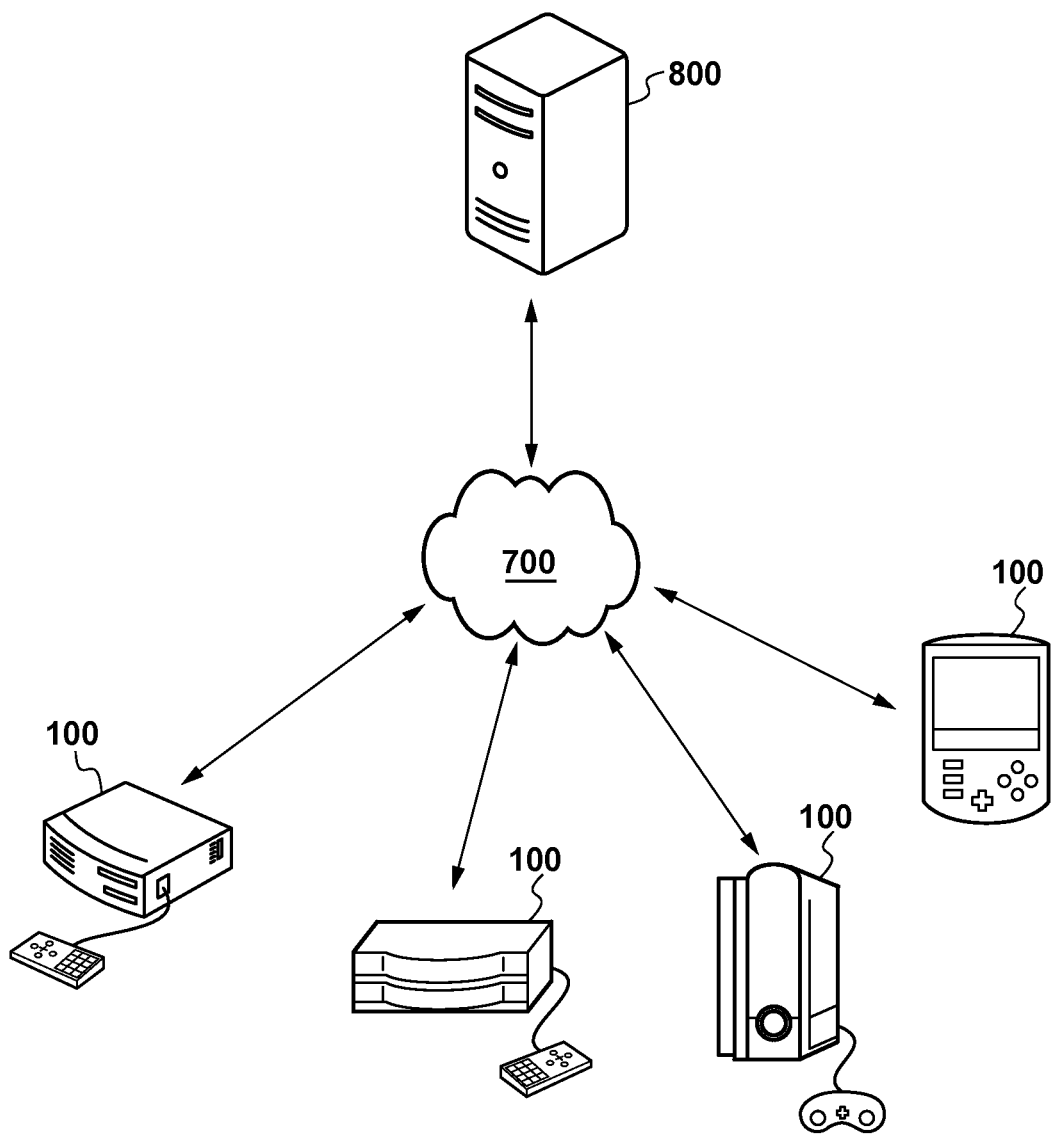

F I G. 10
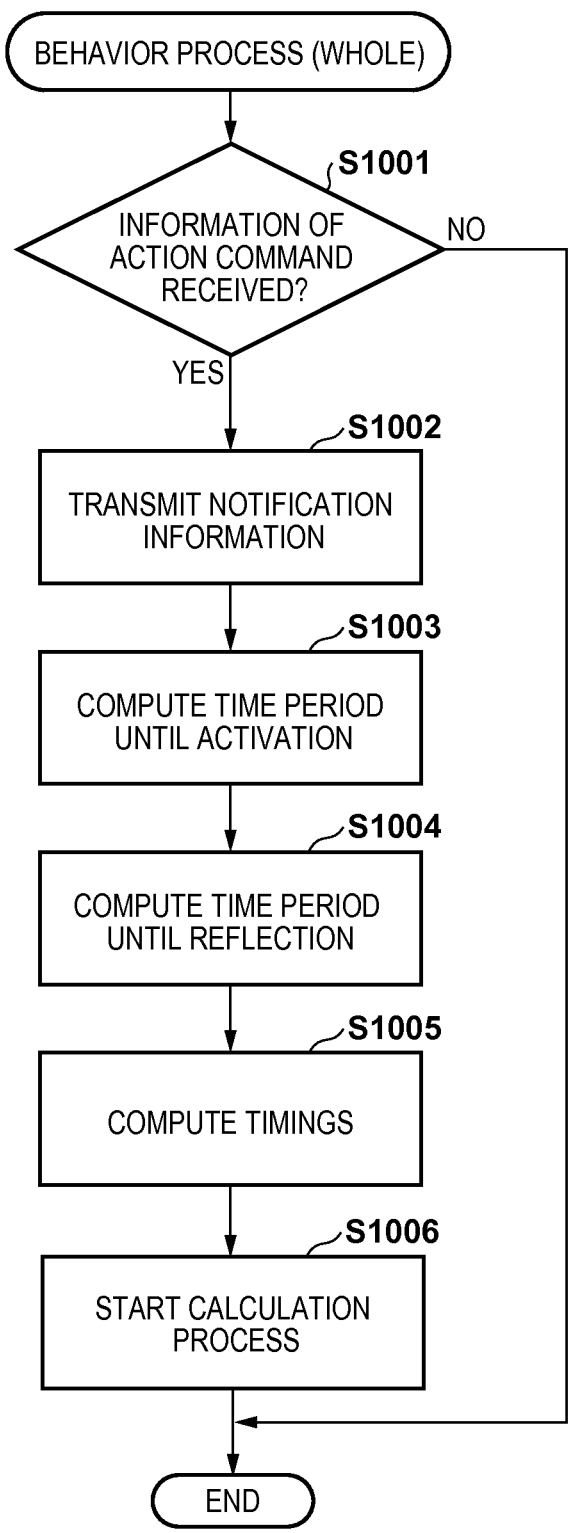

GAME SYSTEM, INFORMATION PROCESSING APPARATUS, CONTROL METHOD, AND RECORDING MEDIUM

BACKGROUND OF THE INVENTION

Field of the Invention

The present invention relates to a game system, an information processing apparatus, a control method, and a recording medium, and particularly to an electronic game that makes use of inter-apparatus communication.

Description of the Related Art

Some of game apparatuses that execute game programs recorded in a predetermined recording medium, such as home-use game console and PCs, reflect information obtained through communication with another game apparatus in a game to provide. Such communication between game apparatuses is performed using various schemes, whether it is wired or wireless.

Delay occurs not only in communication between game apparatuses, but also in transmission/reception of data, in accordance with a transmission path. That is to say, when data is transmitted from one apparatus, another apparatus completes reception of the entire data after the elapse of a predetermined time period required for transmission. As a time period of delay in transmission/reception of data is extended and shortened in accordance with an amount of transmitted data, various techniques have been proposed as methods of structuring and transmitting/receiving data with a shortened time period of delay.

In addition, some game content requires update of game screens at a predetermined interval, whether or not there is delay in received data. With such game content, in a case where data is not received from another game apparatus within a time period prescribed as an update interval, data that is expected be received may be estimated from data received in the past, and reflection processing may be applied to a game based on the result of estimation (Japanese Patent No. 5357752).

In the case of game content in which reflection processing is applied to a game based on the estimation as in Japanese Patent No. 5357752, delay is compensated for by, for example, executing interpolation processing for ensuring consistency with data received after the reflection processing. In addition, as accumulation of differences from actual data owing to compensation for delayed data could possibly lead to processing failure, the differences may be reset at a predetermined timing so as to apply the reflection processing to the game that used received data without performing interpolation.

However, in a case where such interpolation processing, resetting of a difference amount, etc. are executed, the following problems could possibly occur. For example, consider the following situation: a plurality of players who use mobile game apparatuses are in a positional relationship where they can check each others' screens in real space, and the game apparatuses can independently execute the interpolation processing, resetting of a difference amount, etc. In this situation, for example, the following phenomena could possibly occur in a car racing game and the like: the rankings of cars operated by the players differ between the game apparatuses; and resetting of a difference amount causes a car of another player to suddenly appear in a place where it did not exist until then. Such inconsistency between the game apparatuses has a possibility of lowering the interest of the players.

SUMMARY OF THE INVENTION

The present invention was made in view of such problems in the conventional technique. The present invention provides a game system, an information processing apparatus, a control method, and a recording medium that realize favorable game experiences in which delay occurring between game apparatuses is allowed.

The present invention in its first aspect provides a game system for executing a game that progresses in response to action commands issued on a plurality of electronic devices, the game system comprising: a notifier which is able to, when a first action command has been issued on a first electronic device, notify a second electronic device of the issuance of the action command on the first electronic device, the second electronic device being different from the first electronic device; a setter which is able to set a first time period until an action triggered by the first action command is reflected in the game; and a reflector which is able to, after the first time period has elapsed from time based on the first action command, reflect the action triggered by the first action command in the game executed by the second electronic device.

The present invention in its second aspect provides an information processing apparatus for executing processing for a game that progresses in response to action commands issued on a plurality of electronic devices, the information processing apparatus comprising: a notifier which is able to, when a first action command has been issued on a first electronic device, notify a second electronic device of the issuance of the action command on the first electronic device, the second electronic device being different from the first electronic device; a setter which is able to set a first time period until an action triggered by the first action command is reflected in the game; and a reflector which is able to, after the first time period has elapsed from time based on the first action command, reflect the action triggered by the first action command in the game.

The present invention in its third aspect provides a control method for an information processing apparatus for executing processing for a game that progresses in response to action commands issued on a plurality of electronic devices, the control method comprising: the notifying step of, when a first action command has been issued on a first electronic device, notifying a second electronic device of the issuance of the action command on the first electronic device, the second electronic device being different from the first electronic device; a setting step of setting a first time period until an action triggered by the first action command is reflected in the game; and a reflecting step of, after the first time period has elapsed from time based on the first action command, reflecting the action triggered by the first action command in the game.

Further features of the present invention will become apparent from the following description of exemplary embodiments (with reference to the attached drawings).

BRIEF DESCRIPTION OF THE DRAWINGS

FIG. 4 is a flowchart exemplarily showing an action process (own device) executed by the game console 100 according to the first embodiment of the present invention.

FIGS. 6A and 6B show structures of various parameter tables managed for a battle game according to an embodiment of the present invention.

FIG. 7 shows a system configuration of a game system according to a second embodiment of the present invention.

FIG. 10 is a flowchart exemplarily showing an action process (whole) executed by the server 800 according to the second embodiment of the present invention.

DESCRIPTION OF THE EMBODIMENTS

[First Embodiment]

The following describes an illustrative embodiment of the present invention in detail with reference to the attached drawings. Note, the following one embodiment describes an example in which the present invention is applied to a system for executing a game that progresses while a plurality of connected game consoles 100 communicates with one another, as one example of a game system. However, the present invention is applicable to any device and system capable of executing a game that progresses in response to action commands issued on a plurality of electronic devices.

<<Configuration of Game Console 100>>

Figure 1:
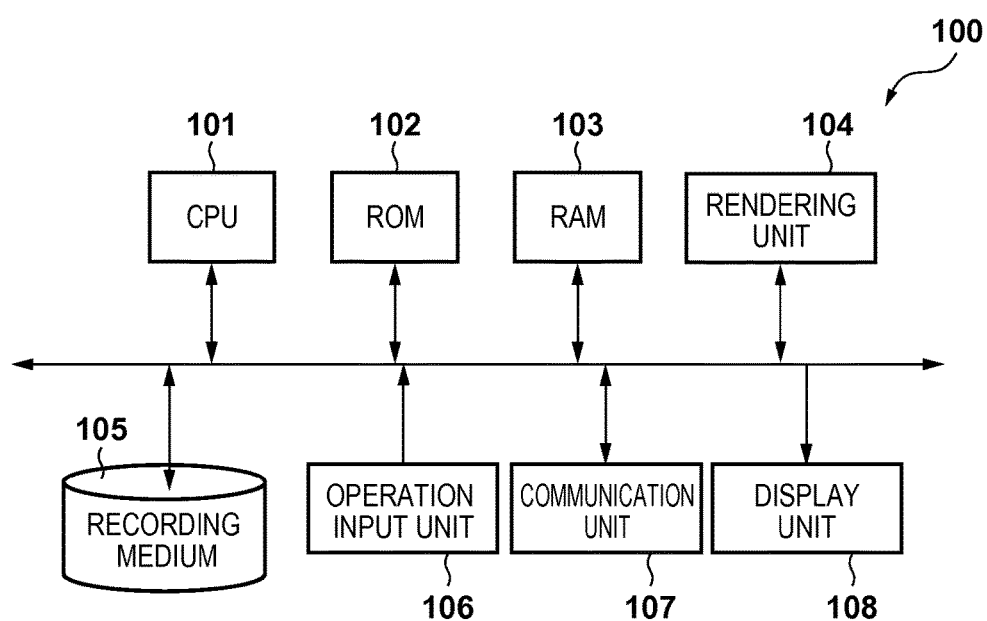
FIG. 1 is a block diagram showing a functional configuration of a game console 100 according to embodiments of the present invention.

FIG. 1 is a block diagram showing a functional configuration of a game console 100 constituting a game system according to an embodiment of the present invention.

A CPU 101 controls operations of blocks included in the game console 100. The CPU 101 controls the operations of the blocks by reading out operation programs for the blocks recorded in, for example, a ROM 102 and a recording medium 105, extracting the read operation programs to a RAM 103, and executing the extracted operation programs.

The ROM 102 is an electrically rewritable non-volatile memory. The operation programs for the blocks included in the game console 100, parameters necessary for the operations of the blocks, and the like are recorded in the ROM 102. The RAM 103 is a volatile memory. The RAM 103 is used not only as an area to which the operation programs for the blocks are extracted, but also as a storage area in which, for example, intermediate data output in the operations of the blocks is temporarily recorded.

A rendering unit 104 is, for example, a rendering apparatus that renders a game screen for a game, such as a GPU. The rendering unit 104 receives a rendering command from the CPU 101, and renders a game screen into a video memory by processing data for a rendering object extracted to a GPU memory, not shown, in accordance with the command.

The recording medium 105 is a recording apparatus that is connected to the game console 100 in an attachable/detachable manner, such as an HDD, a disc storing a game program, and the like. The recording medium 105 stores not only the operation programs for the blocks included in the game console 100, but also, for example, data for a rendering object that is necessary for rendering a game screen.

An operation input unit 106 is various types of user interfaces included in the game console 100, such as a controller and a keyboard. Upon detection of operation input, the operation input unit 106 outputs a corresponding control signal to the CPU 101.

A communication unit 107 is a communication interface that is included in the game console 100 and is for communication with an external device. In the present embodiment, the game console 100 is connected to another game console 100 via wireless communication, performs communication during execution of a game, and transmits/receives necessary data. While it is assumed in the description of the present embodiment that the game console 100 communicates with another game console 100 via wireless communication, a communication scheme of the communication unit 107 is not limited to wireless communication, and a scheme of direct wired connection may be used.

A display unit 108 is, for example, a display apparatus such as an LCD. The display unit 108 may be configured integrally with the game console 100, and may be an external display apparatus that is connected to the game console 100 in an attachable/detachable manner. The display unit 108 displays a game screen generated by the game console 100.

<<Delay Occurring in Game>>

A description is now given of elements of delay that occurs with respect to an action command issued in a game by an operation of a player. In the description of the present embodiment, a game executed in a game system is assumed to be a so-called real-time strategy (RTS) game that progresses while arranging units, such as characters, on a field and issuing action commands to the arranged units. However, it should be easily understood that embodiments of the present invention are not limited to such an RTS game.

Unlike a turn-based game, the RTS game constantly progresses, even during a time period in which players perform no operation, and therefore the players need to sequentially generate and arrange units used by themselves, move the units, collect items, search for the fields, or issue an action command for, for example, attacking an opponent player to battle. The players also need to take real-time countermeasures against actions taken by the opponent player, or issue an action command while thinking about, for example, preliminarily advancing a preparation for an avoidance action in real time in anticipation of an action that could possibly be taken by the opponent player.

In the RTS game, a large number of units are arranged on a field, and it is not practical for the players to cause one unit to act in real-time conformity with their operations; therefore, an action command to a unit is normally issued by defining a final goal to be achieved and an intermediate goal to be achieved by actions. That is to say, when an action command has been issued, actions that a target unit takes until it reaches a goal are not instantly generated in accordance with an operation, but are generated either through predetermined calculation according to the command, or in accordance with information of a predetermined action pattern provided as an AI program. In other words, when a predetermined action command has been issued, calculation for sequentially deciding on actions that are taken to reach a set goal to be achieved is necessary on a unit-by-unit basis. Also, in a case where the final goal to be achieved entails effects that bring about damages or other influences on a field and units representing opponent characters through geographic deformations, destruction of structures, etc., as well as rendering effects involving physical calculation and the like, it is necessary to further perform calculation for such effects in accordance with the situation upon reaching the final goal to be achieved. That is to say, as a game situation progresses in real time in the RTS game, there is a high possibility that the game situation differs between when a command is used and when an action for the final goal to be achieved is executed. For this reason, it is necessary to, for example, obtain game parameters upon reaching the goal so as to calculate an effect of an action to be taken and the like, or execute processing for correcting a calculation result that has already been yielded using the game parameters. Therefore, an amount of calculation changes in accordance with a selected action in processes that are sequentially executed in relation to generation of intermediate actions, such as movements until the goal to be achieved is reached, and in processing that is executed in relation to the occurrence of action-induced effects and rendering effects. That is to say, delay (an activation delay) could possibly occur in accordance with an amount of calculation until processing executed in accordance with an issued action command is reflected in the game. Considering that an amount of calculation that a device can perform in a unit time (processing resources) is limited, for example, in a case where a large number of units are arranged on a field, such an activation delay could possibly be extended in accordance with the number of units because action-related processing is executed for all of the units.

Furthermore, in a case where a battle game is executed by two game consoles 100 that are connected for communication as in the present embodiment, an action command corresponding to operation input performed by each player is specified by applying processing of input evaluation and the like to the operation input in the game console 100 used by the player. The specified action command is first reflected in game parameters managed in the game console 100 that executed the processing, and then the game parameters reflecting the specified action command are transmitted to the game console 100 of the opponent to battle. Therefore, from when the operation input is performed to when parameters are changed in another game console 100 in relation to the operation input, there is delay (hereinafter, a communication delay) corresponding to a time period for processing in the game console 100 for which the operation input is performed, transmission/reception of the parameters between the game consoles 100, and a reflection process for game parameters in the game console 100 of the opponent to battle. At this time, an amount of delay for transmission/reception of a processing result increases and decreases, especially depending on the communication condition between the game consoles 100. The communication condition involves, for example, a transmission distance between the game consoles 100, existence of obstacles in a communication environment, reception failure caused simply by a packet loss, and the like. As a time period until completion of reception of a processing result is extended and shortened depending on a data amount of information for the processing result, in a case where a processing result for effects, such as physical calculation, is transmitted, an amount of delay for transmission/reception of the processing result naturally increases accordingly.

It is assumed that, in the RTS game according to the present embodiment, the game consoles 100 transmit/receive data of operation input to/from each other, and they do not use a scheme in which each of them independently evaluates operation input and reflect the same in game parameters. This is because an amount of calculation increases if each of the game consoles 100 processes operation inputs for a plurality of consoles, and because independent processing leads to, for example, inconsistency in calculation results in the consoles caused by different reception timings and the like. However, embodiments of the present invention are not limited in this way; information of an action command corresponding to the specified operation input may be transmitted to the game console 100 of the opponent to battle, a reflection process for game parameters may be executed in this game console 100.

Also, with regard to a game application provided to general game consoles, as general game consoles do not differ from one another in terms of basic performances, they do not differ from one another in terms of a processing time period required for reflection in game parameters and evaluation of operation input. However, in a case where players use devices of different performances, such as PCs, the devices have different processing abilities, and therefore the devices differ from one another in terms of a time period until the result of operation input is reflected; that is to say, from a viewpoint of one device, a longer delay (hereinafter, a performance delay) could possibly occur until the result is reflected in another device.

The present embodiment describes a method of sustaining the interest of players while allowing at least an activation delay and a communication delay among the foregoing delays that occur in a game.

<<Overview of Game>>

An overview of the RTS game according to the present embodiment will now be described with reference to FIGS. 2A to 2C. In the following description, for simplicity, the RTS game is assumed to be executed as a battle game between two game consoles 100.

Figure 2A:
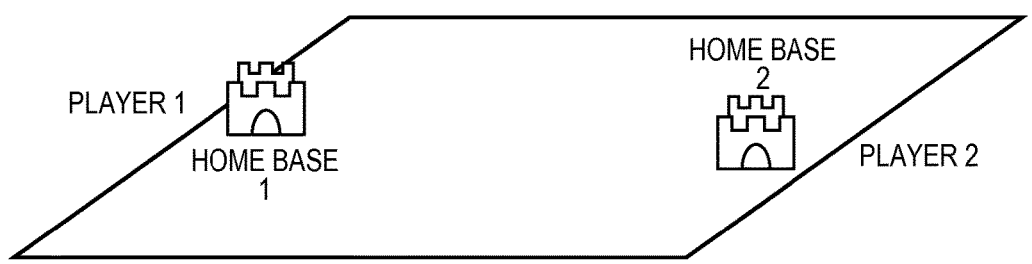
FIGS. 2A, 2B and 2C are diagrams for describing an overview of a battle game according to embodiments of the present invention.
Figure 2B:
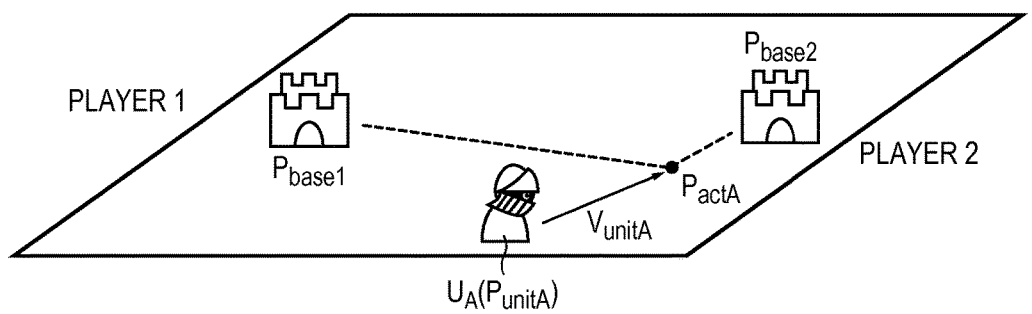

In the RTS game according to the present embodiment, players of the game consoles 100, who battle each other, are assigned different positions on a game field (hereinafter, simply a field) as home positions (home bases) as shown in FIG. 2A. It is assumed that these home bases do not move during the game. The players arrange units under their control on the field, and issue action commands to the units so as to cause the units to take corresponding actions. It is assumed that, in the present RTS game, a player who damages a unit or a home base of an opponent to battle and first brings durability set at the home base to zero ultimately becomes the winner of the game.

A description is now given of an overview of processing that is executed when the players issue an action command to a unit on the field until an action related to the action command is reflected in the game. In the RTS game according to the present embodiment, a distance between the home bases of the players on the field is decided on based on a delay amount of communication for transmission of predetermined unit data between the game consoles 100. That is to say, the larger a measured delay amount of communication between the game consoles 100 is, the more the interval between the two is depicted on the field. This interval may be reflected in the game as an actual distance on the field, and may be reflected in the game by changing the speed and difficulty of the progress of a unit with the size of the field unchanged from a preset size. While it is assumed in the description of the RTS game according to the present embodiment that the interval between the home bases of the players on the field is prescribed based on a delay amount of communication, such a change is not essential. The interval between the home bases of the players may be set based on a preset rule, may have a fixed value, and may be randomly set.

In the RTS game according to the present embodiment, in a case where an action command for a certain action has been issued, a time period required until the activation of the action is decided on in consideration of all of an activation point of the action, a current position of a unit that takes the action, and an amount of calculation for the action. For example, as shown in FIG. 2B, assume that a player 1 has issued, to his/her unit $U_A$ currently arranged at a point $P_{unitA}$, an action command for an action whose activation point is a point $P_{actA}$, which is far from a home base $P_{base1}$ of the player 1 and close to a home base $P_{base2}$ of a player 2. It is assumed here that, for example, a time period required until the activation of the action, that is to say, a time period required until a notification of the activation of the action being issued after actually completing calculation processing, is decided as a sum of the followings:

1. A time period required to convey a command from the home base to the unit $U_A$ (proportional to a distance between the home base $P_{base1}$ and the point $P_{unitA}$);
2. A time period required for the unit $U_A$ to move from the point $P_{unitA}$ to the activation point $P_{actA}$ (proportional to a product of a moving velocity $V_{unitA}$ set for the unit and a distance from the point $P_{unitA}$ to the activation point $P_{actA}$); and
3. A preset time period required for the activation of the action (proportional to a product of an accomplishment ability $A_{unitA}$ set for the unit $U_A$ and a time period $T_{need}$ preset in accordance with an amount of calculation for the action).

Also, a time period until the effect of the activated action being reflected in a game screen is decided as:

4. A time period required to propagate the effect from the activation point $P_{actA}$ to the home base of the players (proportional to distances between the activation point $P_{actA}$ and the home bases $P_{base1}$, $P_{base2}$ of the players).

That is to say, in the RTS game according to the present embodiment, when each player attempts to activate an action at a point that is far from his/her home base and close to the home base of an opponent player, he/she needs to wait for a time period according to a distance from the home base to the activation point. Also, if the action to be activated necessitates a large amount of calculation for processing for generation of intermediate actions, generation of effects, and the like, each player needs to wait further for a time period until the activation. Moreover, propagation of the effect of the activated action is delayed on purpose in accordance with the distance between the activation point and the home base.

Figure 2C:
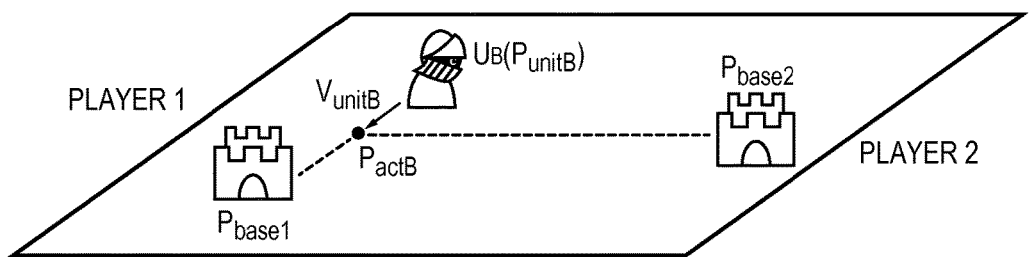

Conversely, for example, as shown in FIG. 2C, assume that the player 1 has issued, to his/her unit $U_B$ currently arranged at a point $P_{unitB}$ an action command for an action B whose activation point is a point $P_{actB}$, which is close to the home base $P_{base1}$ of the player 1 and far from the home base $P_{base2}$ of the player 2. At this time, a time period required until the activation of the action B is shorter than the time period required until the activation of the action in the example of FIG. 2B, and a time period until propagation of the effect is similarly shortened.

That is, in the RTS game according to the present embodiment, a distance between players in the game is prescribed based on a delay amount of communication of unit data, and a time period required until the activation of an action is prescribed in advance in consideration of an activation delay that could possibly occur due to processing with a large amount of calculation and a communication delay caused by a large transmission amount of a processing result, such as the effects; in this way, the occurrence of inconsistency and processing failure attributed to delay in a battle game executed via communication is avoided. Furthermore, as control is performed to issue a notification of an effect of the activated action in accordance with the distance, the spread of propagation can be staged. In other words, by thus creating delay in the activation and propagation of an action in advance and completing calculation during the delay, the influence of the above-described activation delay and communication delay on the game can be avoided without reducing the interest of the players.

<<Action Management Processing>>

Figure 3:
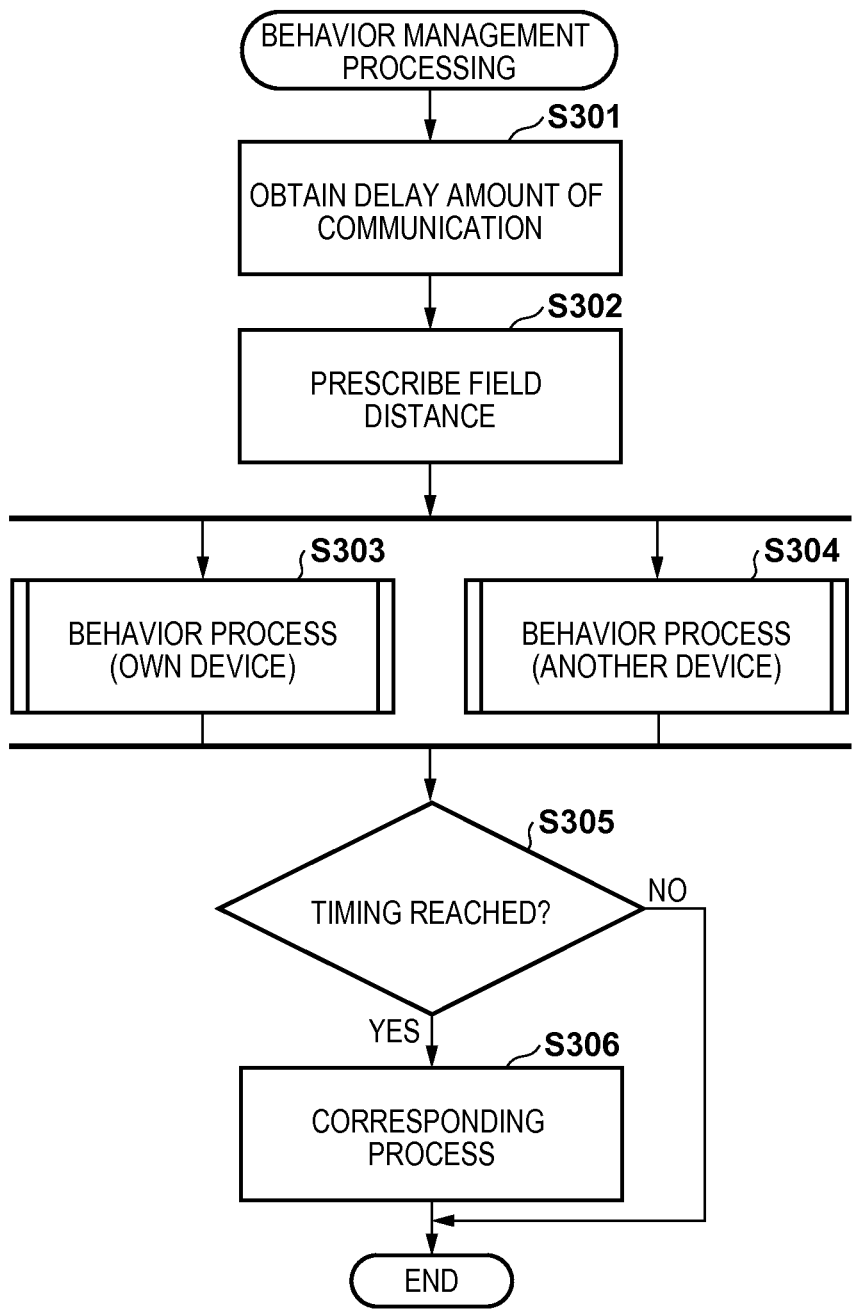
FIG. 3 is a flowchart exemplarily showing action management processing executed by a game console 100 according to a first embodiment of the present invention.

With reference to a flowchart of FIG. 3, the following describes the detail processes of action management processing for the above-described battle game realized in the game system according to the present embodiment. Processing corresponding to this flowchart can be realized by the CPU 101 of each game console 100 reading out a program for a game application stored in, for example, the recording medium 105, extracting the read program to the RAM 103, and executing the extracted program.

In the following description, it is assumed that the present action management processing is started when, for example, game consoles 100 that participate in a battle game provided by the game application are set by a plurality of game consoles 100 issuing a command for executing the battle game, and the present action management processing is executed repeatedly on a frame-by-frame basis. Also, for simplicity, it is assumed in the description of the present embodiment that the battle game is executed between two game consoles 100 that have the same performance. Furthermore, while it is assumed in the following description that the flowchart is executed by the CPU 101 of one of the game consoles 100, the present flowchart may be executed by all of the CPUs 101 of the game consoles 100 that participate in the battle game. It is also assumed that, at the time of the start of the battle game, all of the participating game consoles 100 synchronously start to measure a time period that elapses from the start of the game.

In step S301, the CPU 101 obtains a delay amount of communication that occurs depending on the communication condition relating to communications between the game consoles 100. For example, the CPU 101 transmits a response request to the game console 100 of an opponent to battle, and stores, into the RAM 103, a time period required from the transmission to reception of a response that is returned in response to the request as the delay amount of communication.

In step S302, the CPU 101 prescribes a distance between home bases of the players on a field based on the delay amount of communication. Obtainment of the delay amount of communication and changing of the distance between the home bases may be performed only at the time of the start of the battle game, and may be performed at a predetermined frame interval so as to dynamically respond to changes in the communication condition.

After the process of step S302, the CPU 101 executes the following processes in parallel: an action process (own device) of step S303, in which it executes a process corresponding to operation input for an action command that has been newly issued on the game console 100 of own; and an action process (another device) of step S304, in which it executes a process corresponding to operation input for an action command that has been newly issued on another game console 100.

<Action Process (Own Device)>

A description is now given of the specifics of the action process (own device) that is executed by the CPU 101 in step S303 of the action management processing with reference to a flowchart of FIG. 4.

In step S401, the CPU 101 determines whether or not operation input for an action command has been performed. In the battle game according to the present embodiment, the CPU 101 proceeds to step S402 if it determines that the operation input for the action command has been performed, and to step S406 if it determines that the operation input for the action command has not been performed.

In step S402, the CPU 101 interprets the action command corresponding to the operation input, and transmits information indicating the issuance of the action command, a time period that has elapsed from the issuance of the action command, and information of coordinates at which an action X for the action command is activated to the communication unit 107 so as to transmit them in association with identification information of the action X (action identification information) to the game console 100 of the opponent to battle. The CPU 101 also stores these pieces of information into its RAM 103.

In the battle game according to the present embodiment, when an action command has been issued, the type of an action is not specified, and the opponent to battle is notified of the issuance of the action command for some sort of action at the activation coordinates. This notification is reflected in the game executed by the game console 100 and presented to the player of the game console 100 as a notification message. This is intended to eliminate the unfairness associated with adjustment of the activation of an action in the game in accordance with delay, as will be described later. In addition, by thus issuing a preliminary notification of the activation of some sort of action, the opponent player to battle can take an action in anticipation of an action that could possibly be taken. At this time, if a time period required until the activation of the anticipatory action is shorter than a time period required until the activation of the action of the notification, there is a possibility that the player can reduce the influence when the action of the notification is activated. Furthermore, if an activation point of the action of the notification is close to the home base of the player on the field, the player has a geographical advantage and hence can earn a time period for taking preventive measures to a greater extent.

In step S403, the CPU 101 computes a time period until the activation of the action X. First, the CPU 101 refers to various types of parameter tables stored in the recording medium 105, and obtains information of a moving velocity, an accomplishment ability, and a time period required for the activation of a unit to which the command has been issued. Then, the CPU 101 computes the time period until the activation based on these parameters, the activation coordinates of the action X, and the current coordinates of the unit to which the command has been issued. In the battle game according to the present embodiment, as shown in, for example, FIG. 6A, the recording medium 105 stores a unit parameter table in which the following are set for units that can be operated by the players in the game on a unit-by-unit basis: a fundamental parameter (basic parameter), such as durability; a moving velocity; commandable actions; and accomplishment abilities of these actions. As shown in FIG. 6B, the recording medium 105 also stores an action parameter table in which the following are set for actions provided in the battle game on an action-by-action basis: an influence parameter indicating the influence of an action; and a time period required for activation, which is longer than a time period required for calculation for the activation of an action including effect processing. A time period required for activation of each action is set in proportion to a time period required for calculation for the activation of the action. The CPU 101 obtains the above-referenced parameters by referring to these tables, and computes a time period $T_{act}$ until the activation, for example, as follows:

$$T_{act} = \text{RootLength}(P_{unit} - P_{base}) + \text{RootLength}(P_{act} - P_{unit})/V_{unit} + A_{unit} \times T_{need}.$$

Where, RootLength( ) is a function for computing a distance between two points in consideration of geography, $P_{base}$ is the coordinates of a home base, $P_{unit}$ is the current coordinates of a unit, $P_{act}$ is the action activation coordinates, $V_{unit}$ is a moving velocity of the unit, $A_{unit}$ is an accomplishment ability for the action X of the unit (>1), and $T_{need}$ is a time period required for the activation of the action X.

In step S404, the CPU 101 computes a time period until the players are notified of the effect of the activated action X, that is to say, a time period until the result of the activated action X is reflected in the game executed by the game consoles 100 (a time period required for propagation of the effect). A time period until the reflection in the game, $T_{notify}$, is computed as follows based on, for example, a data amount $D_{act}$ of the calculation result of the action X, distances between the activation coordinates of the action X and the coordinates of the home bases assigned to the players of the game consoles 100, and a conversion coefficient K:

$$T_{notify} = D_{act} \times \text{RootLength}(P_{act} - P_{base}) \times K.$$

Where, the conversion coefficient K is an inverse of a conversion coefficient that is used to prescribe the distance between the home bases of the players from the delay amount in step S302 of the action management processing.

While it is assumed in the description of the battle game according to the present embodiment that a time period until the activation of the action related to the action command and a time period until reflection of the result of the action in the game are computed using the two expressions presented above, embodiments of the present invention are not limited in this way. In embodiments of the present invention, in order to equalize the inconsistency caused by the communication delay, it is sufficient to set a time period until the activation of the action such that the farther the activation point is from the home base of the player who issued the command, and the larger the calculation amount of processing for the action is, the more the activation is delayed beyond a delay amount of an activation delay and a delay amount of communication. On the other hand, it is sufficient to decide on a time period until reflection of the result of the action in the game in consideration of a delay amount of communication and a data amount of the calculation result from an apparatus that performs calculation for the action, as will be described later.

In step S405, the CPU 101 assigns a calculation process for the action X to the game console 100 of the player whose home base is closest to the activation coordinates of the action X. Here, if the game console 100 to which the calculation process is assigned (a target console) is different from the game console 100 of own, the CPU 101 transmits information of the time period until the activation of the action, which was computed in step S403, and information of the time period until reflection of the result in the game, which was computed in step S404, to the communication unit 107 so as to transmit them in association with the action identification information of the action X to the target console. On the other hand, if the target console is the game console 100 of own, the CPU 101 holds similar information in the RAM 103.

In step S406, the CPU 101 determines whether or not the calculation process for the action X was assigned to itself in step S405. The CPU 101 proceeds to step S407 if it determines that the calculation process for the action X was assigned to itself, and terminates the present action process (own device) if it determines that the calculation process for the action X was not assigned to itself.

In step S407, the CPU 101 computes an activation timing of the action X and a timing of reflection in the game executed by the game consoles 100, and adds them to a timing table stored in, for example, the RAM 103 in association with the action identification information. The activation timing of the action is obtained by adding "a time period until the activation of the action" to "a time period that has elapsed from the issuance of the action command" associated with the same action identification information stored in the RAM 103. On the other hand, the timing of reflection in the game executed by the game consoles 100 is obtained by further adding "a time period until reflection in the game".

In step S408, the CPU 101 starts the calculation process for the action X. It is assumed that the computation expression in step S403 is prescribed such that the calculation process started here is completed by the activation timing of the action calculated in step S407. In addition, for example, in a situation where a processing delay could possibly occur, e.g., when a large amount of calculation process is assigned to the game console 100, the CPU 101 may extend the timings added to the timing table as appropriate in accordance with the amount of the process. In this case, it is assumed that the game console 100 of the opponent to battle is also notified of the extended timings in association with the corresponding action identification information.

<Action Process (Another Device)>

Figure 5:
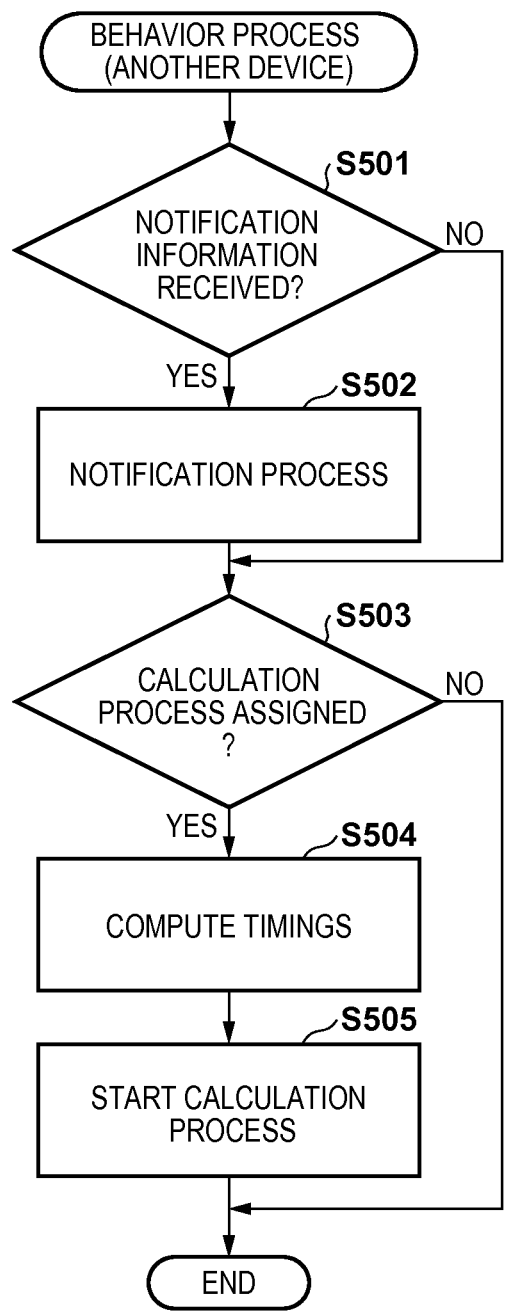
FIG. 5 is a flowchart exemplarily showing an action process (another device) executed by the game console 100 according to the first embodiment of the present invention.

A description is now given of the specifics of the action process (another device) executed in step S304 of the action management processing with reference to a flowchart of FIG. 5.

In step S501, the CPU 101 determines whether or not information indicating the issuance of the action command has been received from the game console 100 of the opponent to battle. The CPU 101 proceeds to step S502 if it determines that the information indicating the issuance of the action command has been received, and proceeds to step S503 if it determines that the information indicating the issuance of the action command has not been received.

In step S502, the CPU 101 stores the received information indicating the issuance of the action command into the RAM 103, reads information of the activation coordinates included in the received information, and sets information indicating the issuance of some sort of action command by the opponent to battle with respect to the coordinates as a notification on a game screen.

In step S503, the CPU 101 determines whether or not a calculation process for the action has been newly assigned to itself. In the present step, the CPU 101 determines that the calculation process has been assigned to itself when information for assignment of the calculation process has been received from the game console 100 of the opponent to battle. The CPU 101 proceeds to step S504 if it determines that the calculation process has been newly assigned to itself, and terminates the present action process (another device) if it determines that the calculation process has not been newly assigned to itself.

In step S504, the CPU 101 computes an activation timing of the action for the newly assigned calculation process and a timing of reflection of the action in the game executed by the game consoles 100, and adds them to a timing table stored in, for example, the RAM 103 in association with the action identification information. It is sufficient to compute the activation timing of the action and the timing of reflection in the game executed by the game consoles 100 as in step S407 of the action process (own device).

In step S505, the CPU 101 starts the newly assigned calculation process. It is assumed that the computation expression in step S403 of the action process (own device) is prescribed such that the calculation process started here is completed by the activation timing of the action computed in step S504. In addition, for example, in a situation where a processing delay could possibly occur, e.g., when a large amount of calculation process is assigned to the game console 100, the CPU 101 may extend the timings added to the timing table as appropriate in accordance with the amount of the process, similarly to the action process (own device). In this case, it is assumed that the game console 100 of the opponent to battle is also notified of the extended timings in association with the corresponding action identification information.

After the action processes for the own device and another device are executed in parallel in the above-described manner, the CPU 101 determines whether or not there is an action whose activation timing or reflection timing in the timing table has been reached in step S305 of the action management processing; if there is such an action, it issues a notification of the activation and executes a reflection process for the game parameters in step S306, and then terminates the action management processing for a current frame. It is assumed that the calculation result for the action is transmitted to another game console 100 as soon as the calculation is completed, at least by the reflection timing. On the other hand, if there is no action whose activation timing or reflection timing in the timing table has been reached, the CPU 101 terminates the action management processing for the current frame.

As described above, the game system according to the present embodiment enables realization of favorable game experiences in which delay occurring between game apparatuses is allowed. The game system according to the present embodiment executes a game that progresses in response to action commands issued by a plurality of electronic devices. When a first action command has been issued on a first electronic device, the game system notifies a second electronic device, which is different from the first electronic device, of the issuance of the action command on the first electronic device. The game system also sets a first time period until an action triggered by the first action command is reflected in the game, and after the elapse of the first time period from the time based on the first action command, reflects the action triggered by the first action command in the game executed by the second electronic device.

In this way, the game system according to the present embodiment adjusts the time of activation of an action corresponding to an action command issued by a player in consideration of delay that could possibly occur in the game, and hence is able to realize a battle game in which the influence of delay caused by calculation and communication is eliminated or reduced.

[Second Embodiment]

The above first embodiment has described a method of realizing a battle game by way of direct wireless connection between game consoles 100. The present embodiment describes an example of a game system in which a battle game is realized by game consoles 100 used by players connecting to a server 800 via a network 700 as shown in FIG. 7.

In the game system according to the present embodiment, the server 800 plays a role of a central server and performs centralized management of game parameters in the battle game. In the game system according to the present embodiment, the server 800 obtains information of action commands issued on devices operated by the players, executes calculation processes for actions, update game parameters for an entire field, and transmits them to the devices. The devices operated by the players (game consoles 100) update game parameters managed therein based on information of the received game parameters, and generate a game screen by executing rendering processing based on these parameters.

The present embodiment also describes processing for a case in which the players participate in the battle game using game consoles 100 with different calculation abilities.

<<Configuration of Server 800>>

Figure 8:
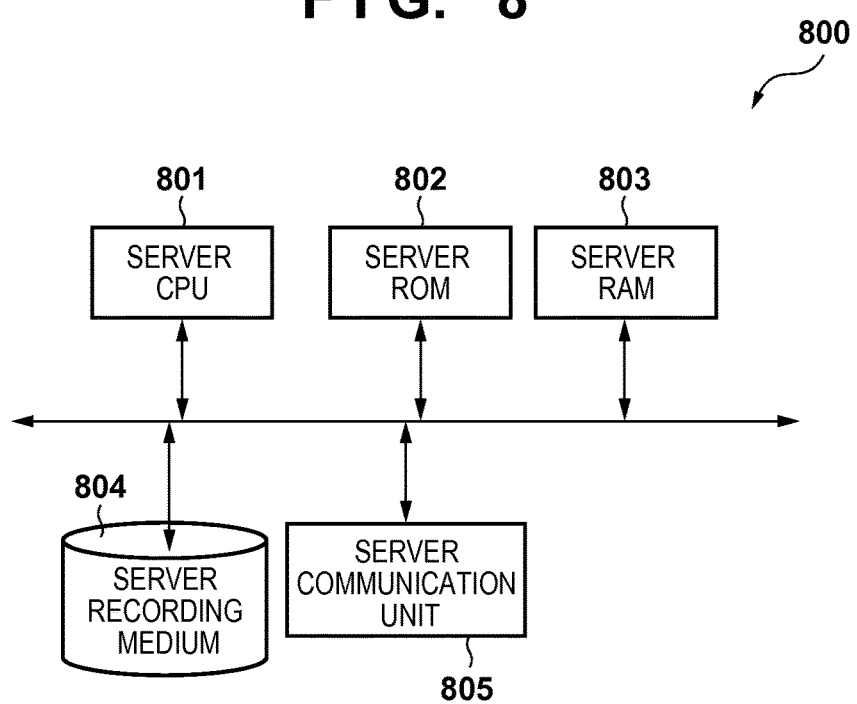
FIG. 8 is a block diagram showing a functional configuration of a server 800 according to the second embodiment of the present invention.

FIG. 8 is a block diagram showing a functional configuration of the server 800 that functions as the central server in the game system according to the second embodiment.

A server CPU 801 controls operations of blocks included in the server 800. The server CPU 801 controls the operations of the blocks by reading out operation programs for the blocks recorded in, for example, a server ROM 802 and a server recording medium 804, extracting the read operation programs to a server RAM 803, and executing the extracted operation programs.

The server ROM 802 is an electrically rewritable nonvolatile memory. The operation programs for the blocks included in the server 800, parameters necessary for the operations of the blocks, and the like are recorded in the server ROM 802. The server RAM 803 is a volatile memory. The server RAM 803 is used not only as an area to which the operation programs for the blocks are extracted, but also as a storage area in which, for example, intermediate data output in the operations of the blocks is temporarily recorded.

The server recording medium 804 is a recording apparatus that is connected to the server 800 in an attachable/detachable manner, such as an HDD and the like. Not only the operation programs for the blocks included in the server 800, but also various types of parameters necessary for calculation and the like are recorded in the server recording medium 804.

A server communication unit 805 is a communication interface that is included in the server 800 and is for communication with an external device. In the present embodiment, the server 800 is connected to the game consoles 100, which are client devices, via the network 700, performs communication during execution of a game, and transmits/receives necessary data.

<<Action Management Processing>>

Figure 9:
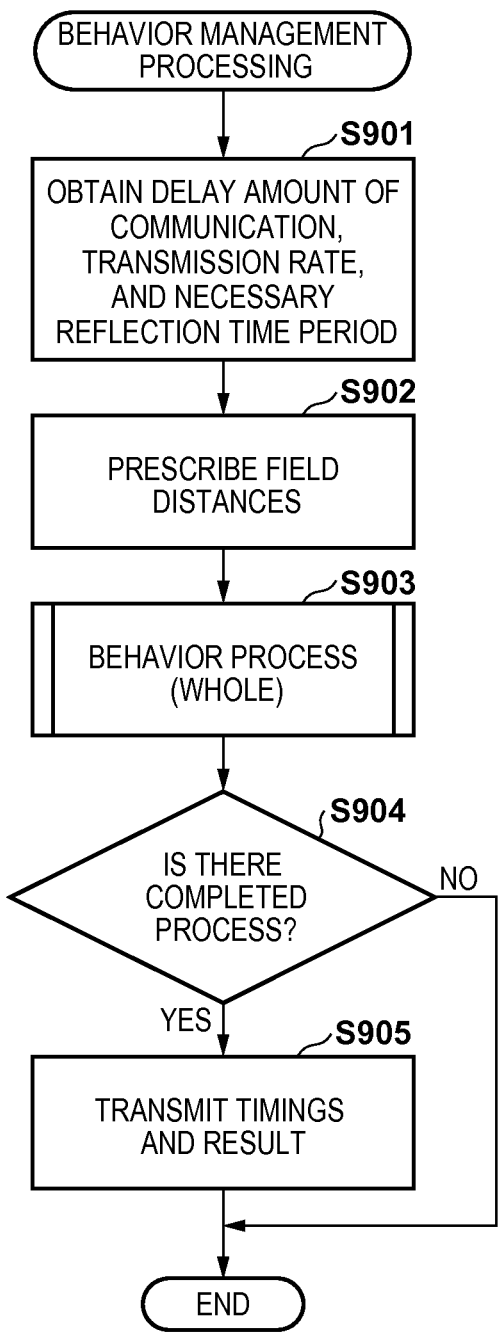
FIG. 9 is a flowchart exemplarily showing action management processing executed by the server 800 according to the second embodiment of the present invention.

With reference to a flowchart of FIG. 9, the following describes the detail processes of action management processing for the above-described battle game executed by the server 800 with the above-described configuration according to the present embodiment. Processing corresponding to this flowchart can be realized by the server CPU 801 reading out a program of a management application for the battle game recorded in, for example, the server recording medium 804, extracting the read program to the server RAM 803, and executing the extracted program.

In the following description, it is assumed that the present action management processing is started, for example, in synchronization with the start of processing for the game after the execution of the battle game in which a plurality of devices connected to the server 800 participate is decided on, and the present action management processing is executed repeatedly on a frame-by-frame basis. It is also assumed that, upon reception of a synchronous signal transmitted from the server 800 at the time of the start of the battle game, all of the game consoles 100 participating in the game start to measure a time period that elapses from the start of the game.

In step S901, the server CPU 801 obtains, for each game console 100 participating in the battle game, a delay amount of communication that occurs depending on the communication condition. For example, the server CPU 801 transmits a response request to each game console 100, and stores, into the server RAM 803, a time period required from the transmission to reception of a response that is returned in response to the request as the delay amount of communication. The server CPU 801 additionally obtains, from each game console 100, a data transmission rate in communication with the game console 100 (hereinafter, simply transmission rate), as well as information of a time period required from the start of update of game parameters in the game console 100 to presentation of a generated game screen for the updated parameters on the display unit 108 (a necessary reflection time period). The obtained information is stored into the server RAM 803 in association with, for example, a player ID which is identification information of the player.

In step S902, the server CPU 801 prescribes distances between home bases of the players on a field based on the delay amounts of communication. At this time, in a case where the battle game progresses under the assumption that the players of the participating game consoles 100 belong to different groups, that is to say, the players operate their respective independent groups that each have a home base, the distances between the home bases of the players are prescribed based on the amounts of communication delay with respect to the game consoles 100. On the other hand, in a case where the battle game progresses under the assumption that a plurality of players belong to one group, that is to say, one home base is provided to each of groups constituted by a plurality of players, distances between home bases of groups are prescribed based on the largest delay amount of communication among the amounts of communication delay with respect to the game consoles 100 used by the players belonging to each group.

In step S903, the server CPU 801 executes an action process (whole) in which a process corresponding to operation input for action commands newly issued on the game consoles 100 is executed.

<Action Process (Whole)>

A description is now given of the specifics of the action process (whole) executed by the server CPU 801 in step S902 of the action management processing according to the present embodiment with reference to a flowchart of FIG. 10.

In step S1001, the server CPU 801 determines whether or not information for a newly issued action command has been received. In the battle game according to the present embodiment, if a CPU 101 of each game console 100 determines that operation input for the action command has been performed, it interprets the action command corresponding to the operation input and obtains the followings:

Information indicating a unit to which the action command has been issued;
Information indicating the issued action command;
A time period that has elapsed from the issuance of the action command; and
Information of the coordinates at which an action X for the action command is activated.

Then, the CPU 101 transmits these pieces of information to the communication unit 107 so as to transmit them to the server 800 as the information for the newly issued action command. The server CPU 801 proceeds to step S1002 if it determines that this transmitted information for the newly issued action command has been received, and terminates the present action process (whole) if it determines that this transmitted information has not been received.

In step S1002, the server CPU 801 assigns action identification information to the received information for the newly issued action command, and stores them in association into the server RAM 803. The server CPU 801 also generates information indicating the issuance of the action command, a time period that has elapsed from the issuance of the action command, and information of the coordinates at which the action X is activated based on the received information, and transmits the generated information to the server communication unit 805 so as to transmit the same, in association with the action identification information, to all of the game consoles 100 participating in the battle game or to the game consoles 100 other than the game console 100 on which the action command has been issued.

In step S1003, the server CPU 801 computes a time period until the activation of the action X. First, the server CPU 801 refers to various types of parameter tables stored in the server recording medium 804, and obtains information of a moving velocity, an accomplishment ability, and a time period required for the activation of a unit to which the command has been issued. Then, the CPU 101 computes the time period until the activation based on these parameters, the activation coordinates of the action X, and the current coordinates of the unit to which the command has been issued. The time period until the activation of the action X may be computed using, for example, the computation expression in step S403 of the action process (own device) according to the first embodiment.

In step S1004, the server CPU 801 computes a time period until the players being notified of an effect of the activated action X, that is to say, a time period until the result of the activated action X being reflected in the game executed by the game consoles 100. In the present embodiment, the game consoles 100 participating in the battle game have different calculation abilities, and therefore in the present step, for example, the server CPU 801 corrects a value computed using the computation expression shown in step S404 of the action process (own device) according to the first embodiment in accordance with the calculation abilities. For example, the server CPU 801 corrects a value computed based on the information obtained from each game console 100 in step S901 of the action management processing according to the present embodiment, i.e., the transmission rate and the necessary reflection time period of the game console 100, and considers the corrected value as a time period until reflection in the game executed by the game console 100.

In step S1005, the server CPU 801 computes an activation timing of the action X for the newly issued action command and a timing of reflection of the action X in the game executed by each game console 100, and adds them to a timing table stored in, for example, the server RAM 803 in association with the action identification information.

In step S1006, the server CPU 801 starts a calculation process for the action X.

After executing the action process for all of the game consoles 100 connected to the server 800 in the above-described manner, the server CPU 801 determines, in step S904 of the action management processing, whether or not there is a calculation process for which execution has been completed among calculation processes for actions being executed. The server CPU 801 proceeds to step S905 if it determines that there is a calculation process for which execution has been completed, and terminates the present action management processing if it determines that there is no such calculation process.

In step S905, the server CPU 801 reads, from the timing table, information of the activation timing and the reflection timing of each game console 100 associated with the action identification information corresponding to the completed calculation process. The server CPU 801 then transmits the calculation result of this calculation process, in association with the read information of the timings, to the game consoles 100 participating in the battle game via the server communication unit 805, and terminates the present action management processing. In this way, information of the calculation result generated in the server 800 is transmitted to the game consoles 100, and it is sufficient for each of the CPUs 101 to issue a notification of the activation of the action or execute a reflection process for the game parameters when a time period that has elapsed in the apparatus matches the associated timing.

This enables realization of a battle game in which the influence of delay that could possibly occur in the battle game due to calculation and communication is eliminated or reduced, even when the battle game is executed via the server 800 on the network 700.

MODIFICATION EXAMPLE 1

Figure 11:
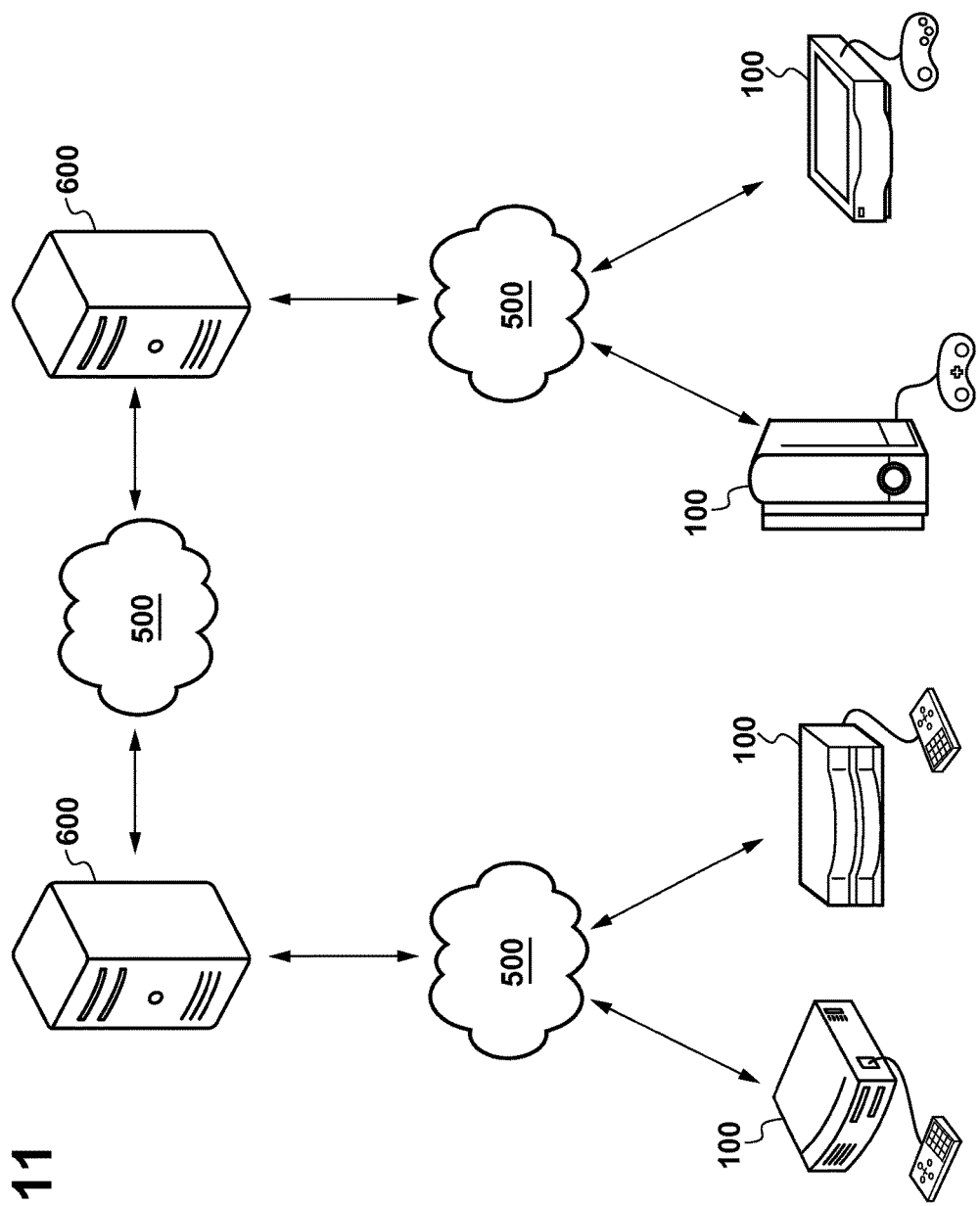
FIG. 11 shows a system configuration of a game system according to a first modification example of the present invention.

While the above second embodiment has described an example in which the battle game is executed by the game consoles 100 connected to one server 800 on the network 700, embodiments of the present invention are not limited to this system configuration. For example, as shown in FIG. 11, the game system may be configured in such a manner that each game console 100 connects to a server 800 placed in, for example, a region closest to the game console 100 and is able to execute a battle game with game consoles 100 connected via this server to another server 800. In this case, it is necessary to take into consideration a communication delay between the servers 800, in addition to a communication delay between each game console 100 and a server 800 connected to the game console 100. Furthermore, as different regions have different traffics, a method of computing an activation timing and a reflection timing may differ in consideration of the traffics.

Similarly to the first embodiment, in the game system according to the present modification example, execution of a calculation process for an action may be assigned to a server 800 connected to a game console 100 that is assigned a home base close to an activation point of an action for which a command has been issued. Alternatively, it may be assigned to a server 800 that has been decided on in consideration of the number of connected terminals, traffics, processing abilities, etc.

In a case where a battle game is executed by game consoles 100 connected to a server 800 as in the game systems according to the second embodiment and the present modification example, players can sense a delay amount of communication with the fixed server 800 in the course of playing the game multiple times. On the other hand, in a case where a battle game is realized by way of a plurality of servers 800 existing in different regions as in the present modification example, it can be said that an amount of delay in communication with a server 800 connected to a server 800 in another region, which is set for the first time upon deciding on an opponent to battle, is unknown for players. For this reason, in the game system according to the present modification example, in a case where each player selects an opponent player or group to battle, or in a case where each player is challenged for a battle from another player, a notification of an amount of delay in communication between a server 800 connected to his/her game console 100 and a server 800 connected to a terminal used by the opponent player may be issued before the start of the battle game, so as to make it easier for the players to develop strategies. In addition, information of such an amount of delay in inter-server communication may be configured to be transmitted periodically to game consoles 100 while the game consoles 100 are connected to the servers 800.

Furthermore, as a delay amount of communication changes in proportion to the length of the transmission path, a pseudo delay amount of communication to be reflected in the game may be prescribed in accordance with geographical distances between regions in which communicating servers 800 exist. That is to say, in a case where a player of a game console 100 connected to a server 800 in a country A and a player of a game console 100 connected to a server 800 in a country B battle each other in a battle game, a distance between home bases on a game field may be prescribed in a simplified manner in correspondence with a distance between the countries A and B. With regard to reflection in the game, it is sufficient to prescribe a conversion coefficient in advance to prevent the occurrence of delay-triggered failure in consideration of an average delay amount of communication between the servers 800 in different countries and a geographical distance therebetween. In this way, regardless of a country of a server 800 connected to a game console 100 of an opponent player with whom the battle game is executed, a player can predict an activation timing and a reflection timing and develop strategies as soon as he/she discovers a region of a connection destination by repeatedly playing the game.

MODIFICATION EXAMPLE 2

While it is assumed in the description of the above embodiments and modification example that each game console 100 generates a game screen and displays the same on the display unit 108 after game parameters are updated, embodiments of the present invention are not limited to this style. The present invention is also applicable to, for example, a configuration in which a game screen is rendered and generated on a server side as in a so-called cloud-based game system.

<<Configuration of Server 800>>

Figure 12:
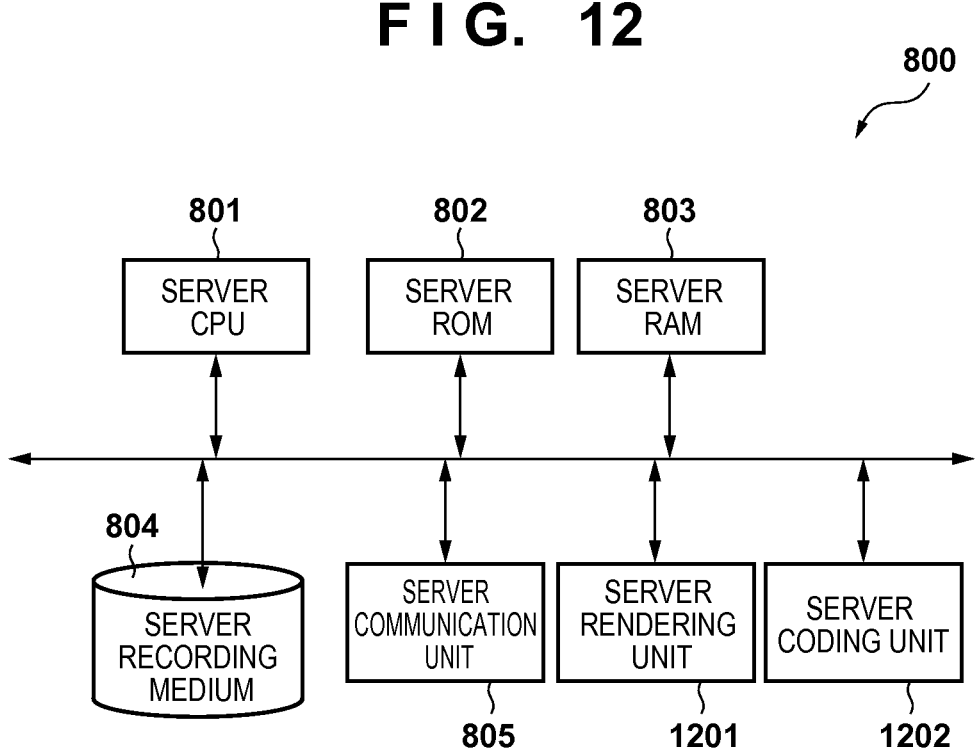
FIG. 12 is a block diagram showing a functional configuration of a server 800 according to a second modification example of the present invention.

In a case where a game screen is rendered on a server side, as shown in FIG. 12, it is sufficient to configure a server 800 to further include a server rendering unit 1201 and a server coding unit 1202 in addition to the constituents of the server 800 shown in FIG. 8.

The server rendering unit 1201 is, for example, a rendering apparatus that renders a game screen for a game, such as a GPU. The server rendering unit 1201 receives a rendering command from the server CPU 801, and renders a game screen into a video memory by processing data for a rendering object extracted to a GPU memory, not shown, in accordance with the command. Game screens are rendered in accordance with point-of-view information transmitted from the game consoles 100.

The server coding unit 1202 generates video data by coding game screens rendered by the server rendering unit 1201. The video data generated by the server coding unit 1202 is transmitted to the server communication unit 805 so as to be transmitted to the corresponding game console 100 as streaming video data.

Note, in this case, the following configurations may be adopted: operation input performed on a game console 100 is transmitted to a server 800 as information of a corresponding action command after being analyzed by the game console 100; and data of operation input is transmitted to a server 800, and the server CPU 801 generates information of a corresponding action command by analyzing the data.

In a server 800 configured in the foregoing manner, the server 800 updates game parameters for rendering of a game screen and generates a game screen, and therefore it is sufficient to take into consideration only processing for decoding of video data with regard to delay caused by processing in game consoles 100.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. Also, the game system, the information processing apparatus and the control method according to the present invention are realizable by a program executing the methods on a computer. The program is providable/distributable by being stored on a computer-readable storage medium or through an electronic communication line.

This application claims the benefit of Japanese Patent Application No. 2014-045522, filed Mar. 7, 2014, which is hereby incorporated by reference herein in its entirety.

What is claimed is:

1. A game system for executing a game that progresses in response to action commands issued on a plurality of electronic devices, the game system comprising:
   a calculator configured to perform a calculation for execution of the game;
   a notifier configured to notify, when a first action command has been issued on a first electronic device, a second electronic device of the issuance of the first action command on the first electronic device, the second electronic device being different from the first electronic device;
   a setter configured to set a first time period until an action triggered by the first action command is reflected in the game; and
   a reflector configured to reflect, after the first time period has elapsed from time based on the first action command, the action triggered by the first action command in the game executed by the second electronic device, wherein between the time based on the first action command and the elapse of the first time period, the calculator performs a calculation for reflecting the action triggered by the first action command in the game.

2. The game system according to claim 1, further comprising an obtainer configured to obtain a delay amount of data transmission that occurs between the first electronic device and the second electronic device, wherein the setter decides on the first time period based on the delay amount obtained by the obtainer.

3. The game system according to claim 2, wherein the delay amount is decided on in accordance with a geographical positional relationship between the first electronic device and the second electronic device.

4. The game system according to claim 1, wherein the setter decides on the first time period based on a calculation amount for reflecting the action in the game.

5. The game system according to claim 1, wherein the setter decides on the first time period based on time that is preset for the action triggered by the first action command.

6. The game system according to claim 1, wherein in a case where a second action command has been issued on the second electronic device after the issuance of the first action command, the notifier notifies the first electronic device of the issuance of the second action command on the second electronic device, the setter sets a second time period until an action triggered by the second action command is reflected in the game, and in a case where an elapse of the first time period from the issuance of the first action command takes place after an elapse of the second time period after the issuance of the second action command, the reflector reduces an effect of the action triggered by the first action command in accordance with an effect of the action triggered by the second action command, and then reflects the reduced effect in the game.

7. An information processing apparatus for executing processing for a game that progresses in response to action commands issued on a plurality of electronic devices, the information processing apparatus comprising:

a calculator configured to perform a calculation for execution of the game;

a notifier configured to notify, when a first action command has been issued on a first electronic device, a second electronic device of the issuance of the first action command on the first electronic device, the second electronic device being different from the first electronic device;

a setter configured to set a first time period until an action triggered by the first action command is reflected in the game; and a reflector configured to reflect, after the first time period has elapsed from time based on the first action command, the action triggered by the first action command in the game, wherein between the time based on the first action command and the elapse of the first time period, the calculator performs a calculation for reflecting the action triggered by the first action command in the game.

8. The information processing apparatus according to claim 7, further comprising a transmitter configured to generate a game screen for the game after the reflection by the reflector, and transmits the game screen to the first electronic device and the second electronic device.

9. A control method for an information processing apparatus for executing processing for a game that progresses in response to action commands issued on a plurality of electronic devices, the control method comprising:

performing a calculation for execution of the game;

notifying, when a first action command has been issued on a first electronic device, a second electronic device of the issuance of the first action command on the first electronic device, the second electronic device being different from the first electronic device;

setting a first time period until an action triggered by the first action command is reflected in the game; and reflecting, after the first time period has elapsed from time based on the first action command, the action triggered by the first action command in the game, wherein in the performing of the calculation, a calculation for reflecting the action triggered by the first action command in the game is performed between the time based on the first action command and the elapse of the first time period.

10. A non-transitory computer-readable recording medium having recorded therein a program for executing processing for a game that progresses in response to action commands issued on a plurality of electronic devices, the program causing one or more computers to execute:

performing a calculation for execution of the game;

notifying, when a first action command has been issued on a first electronic device, a second electronic device of the issuance of the first action command on the first electronic device, the second electronic device being different from the first electronic device;

setting a first time period until an action triggered by the first action command is reflected in the game; and reflecting, after the first time period has elapsed from time based on the first action command, the action triggered by the first action command in the game, wherein in the performing of the calculation, a calculation for reflecting the action triggered by the first action command in the game is performed between the time based on the first action command and the elapse of the first time period.

* * * * *